United States Patent [19]

Dillenburg et al.

[11] 3,832,447
[45] Aug. 27, 1974

[54] METHOD FOR PRODUCING SODIUM PERBORATE TRIHYDRATE

[75] Inventors: Helmut Dillenburg, Bad Honningen; Helmut Honig, Sehnde; Rudolf Siegel, Niederbieber, all of Germany

[73] Assignee: Kali-Chemie Aktiengesellschaft, Hannover, Germany

[22] Filed: Oct. 12, 1971

[21] Appl. No.: 188,623

[30] Foreign Application Priority Data
Oct. 16, 1970 Germany.............................. 2050883

[52] U.S. Cl. ................................................ 423/281
[51] Int. Cl. ........................................... C01b 15/12
[58] Field of Search ...................................... 423/281

[56] References Cited
UNITED STATES PATENTS

| 2,828,183 | 3/1958 | Allimer et al. | 423/281 |
| 2,947,602 | 8/1960 | Youngman et al. | 423/281 |
| 3,131,995 | 5/1964 | Gonze et al. | 423/281 |
| 3,375,198 | 3/1968 | Rosenfelder | 423/281 X |
| 3,598,524 | 10/1971 | Reilly | 423/281 |

FOREIGN PATENTS OR APPLICATIONS

| 940,262 | 10/1963 | Great Britain | 423/281 |
| 1,142,304 | 2/1969 | Great Britain | 423/281 |
| 825,071 | 12/1969 | Great Britain | 423/281 |
| 968,742 | 9/1964 | Great Britain | 423/281 |
| 802,434 | 10/1958 | Great Britain | 423/281 |
| 1,079,603 | 12/1967 | Germany | 423/281 |

*Primary Examiner*—Herbert T. Carter
*Attorney, Agent, or Firm*—Spencer & Kaye

[57] ABSTRACT

A method for producing sodium perborate trihydrate, including mixing, at a temperature above 10°C, hydrogen peroxide with a sodium metaborate solution in the presence of seed crystals of sodium perborate trihydrate and means for reducing the solubility of sodium perborate, and maintaining a $NaBO_2$ to $H_2O_2$ ratio in the resulting mixture in the range 1:0.4 to 1:0.7.

5 Claims, No Drawings

METHOD FOR PRODUCING SODIUM PERBORATE TRIHYDRATE

BACKGROUND OF THE INVENTION

The present invention relates to a method for producing a coarse-grained sodium perborate trihydrate by precipitation from solution.

There are four sodium perborates (also referred to as solium peroxoborates) known, namely, the hexahydrate, $NaBO_2(OH)_2\cdot 3H_2O$ (old designation: tetrahydrate, $NaBO_3\cdot 4H_2O$), the tetrahydrate, $NaBO_2(OH)_2\cdot 2H_2O$ (old designation: trihydrate, $NaBO_3\cdot 3H_2O$), and two structures of the monohydrate, $NaBO_2(OH)_2$ (old designation: monohydrate, $NaBO_3\cdot H_2O$). In the following, the old designations are used, because they are still more commonly used.

While the tetrahydrate and the monohydrate have found a large area of usage in washing powders and cleaning agents for providing nascent oxygen, the trihydrate has until now not been introduced into the market. Among the reasons for this are that the trihydrate has been more expensive to produce than the other hydrates and no product suitable for the market could be made.

The tetrahydrate always crystallizes first out of an aqueous solution of sodium metaborate and hydrogen peroxide, so that special measures must be undertaken in order to produce the trihydrate.

However, because the physical properites of the trihydrate are superior to those of the tetra- and monohydrates, a number of attempts have been made in recent years at the production of trihydrate. As compared with the tetrahydrate, the trihydrate has a higher nascent oxygen content, and it can be stored better at higher temperatures as a result of its higher melting point and its low water vapor partial pressure. Compared with the monohydrate, trihydrate has advantages also; for instance, it possesses a better mechanical stability and a better ability to be stored, the monohydrate being hygroscopic.

According to German Pat. No. 944,943, sodium perborate trihydrate is obtained when a suspension of sodium perborate tetrahydrate is stirred at ordinary or slightly higher temperatures. The stirring time amounts to several hours. Considering the fact that sodium perborate tetrahydrate must first be produced in the usual manner, the addition of a long stirring time makes this process economically uncompetitive.

The disadvantage of time is partially cured in German Pat. No. 1,048,881, where the trihydrate is produced in an aqueous solution of boric acid or borax, hydrogen peroxide, and sodium carbonate or sodium hydroxide, or of borax, sodium peroxide, and hydrochloric acid, in the presence of sodium perborate trihydrate. The reactants are present in mol ratios of boron to sodium and of boron to nascent oxygen both in the range 1.4:1 to 0.8:1. This process has, however, the disadvantages that it operates batchwise and that it requires hydrogen peroxide of 35-percent strength.

Two other processes, those described in German Auslegeschrift (published application) No. 1,078,101 and in German Auslegeschrift No. 1,079,603, produce the trihydrate, likewise discontinuously, from aqueous solutions of hydrogen peroxide and sodium metaborate. The crystallization proceeds at temperatures between 10° and 86°C in the presence of sodium perborate trihydrate seed crystals and in the presence of compounds for decreasing the solubility of the sodium perborate. Also these processes require highly concentrated solutions.

All the above-mentioned processes have the considerable disadvantage that the product obtained is always of fine crystals or even powder. Finely particulate product is not accepted by users.

It is true that the problem of fine size is overcome by the process of German Pat. No. 1,209,557, where a coarse-grained trihydrate is obtained. However, this process is expensive in that highly concentrated solutions of sodium perborate or sodium perborate-forming substances are required. The trihydrate is crystallized at temperatures between 15° and 85°C in the presence of sodium perborate trihydrate from a highly concentrated aqueous solution, in which the mol ratio sodium to boron to nascent oxgen to water is approximately 1 : 1 : 1 : maximum 7. The crystals must in some cases be granulated. Also, this rpocess is discontinuous.

SUMMARY OF THE INVENTION

An object of the present invention, therefore, is to provide an economical method for continuously producing a coarse-grained sodium perborate trihydrate.

This as well as other objects which will become apparent in the discussion that follows are achieved, according to the present invention, by a method for producing sodium perborate trihydrate, including mixing, at a temperature above 10°C, hydrogen peroxide with a sodium metaborate solution in the presence of seed crystals of sodium perborate trihydrate and means for reducing the solubility of sodium perborate, and maintaining a $NaBO_2$ to $H_2O_2$ ratio in the resulting mixture in the range 1:0.4 to 1:0.7. In a further development, the method further includes removing a portion of the resulting mixture for collecting sodium perborate trihydrate product, the mixing, maintaining, and removing being performed continuously.

DESCRIPTION OF THE PREFERRED EMBODIMENTS

It is preferred that the mol ratio of $NaBO_2$ to $H_2O_2$ be maintained in the range 1:0.5 to 1:0.6.

The special advantage of the method according to the invention is that it operates continuously and produces a coarse-grained and nicely flowable, salable product having an average particle size of at least 0.20 millimeters.

An important factor in the method of the present invention is the maintaining of a certain sodium metaborate excess during the precipitation of the sodium perborate trihydrate, because it is only when there is a deficiency in the amount of $H_2O_2$ that the formation of coarse cryatals is possible. When stoichiometric mol ratios exist, or when there is an $H_2O_2$ excess, a fine-crystalled product results.

The precipitation of the present invention should be carried out at about 20° to 60°C, and preferably from 30° and 50°C. During the crystallization, stabilizers for the hydrogen peroxide, such as magnesium salts and the like, can be added to the solution.

As means for reducing the solubility of sodium perborate, it is preferred to add alkali salts of strong acids to the reaction medium. Examples are sodium chloride and sodium sulfate.

The method of the invention is distinguised by its simplicity. The identical equipment which has been used for production of the tetrahydrate can be used for the production of trihydrate according to the present invention.

The method of the invention does not require concentrated solutions. Rather, reactant solutions can be at the same concentration levels used in the precipitation of tetrahydrate. A concentrating of solutions thus need not be carried out.

This special advantage of the trihydrate produced by the method according to the invention is its high average particle size and the consequent good flowability of the product. The flowability is determined according to the following test: A round funnel (upper diameter 18 cm, diameter at exit 1.6 cm, length of outflow 16 cm, cone angle 60°, height of side 15 cm) having a closable exit is filled with 250 g of the trihydrate that is to be tested. Flowability is the time in seconds required to empty the funnel of trihydrate. The mositure content of the trihydrate in this test is generally about 0.1 percent $H_2O$ or lower. The flowability of the trihydrate produced according to the invention is from 6 to 10 seconds. Thus, values are achieved such as are required for the tetrahydrate on the market.

The trihydrate of the present invention has excellent storage characteristics. At temperatures around 50° C, at which the tetrahydrate already begins to cake, the trihydrate remains completely flowable.

Also the stability of the trihydrate with reference to its active oxygen content is good. No differences as compared with the tetrahydrate could be noted when using the same stabilizer additives, such as magnesium salts, used for tetrahydrate.

Another advantage of the trihydrate of the invention is its good mechanical stability, which can be measured as follows. A cylindrical ball mill having an inner diameter of 57 mm and a length of 120 mm is filled half-full of lead balls of 5 mm diameter and charged with 50 g trihydrate retained on a DIN (German Standards) No. 30 sieve. The mill is rotated at 145 r.p.m. for 15 minutes, after which the trihydrate is sieved. The weight-percent of material having a particle size less than 0.053 mm is the abrasion. The trihydrate of the present invention gives abrasion values of 5 to 10 percent in this test.

Also the solubility of the present trihydrate equals that of the tetrahydrate of the same particle size and apparent density.

The invention is further illustrated by the examples which follow. In these examples, there is a start-up period, where $NaBO_3 \cdot 3H_2O$ seeds, $H_2O_2$, NaCl, and $H_2O$ are added to a first stirred tank, the liquid temperature in the tank is brought to a desired temperature, for example 40°C, and aqueous $NaBO_2$ is added to bring about a desired $NaBO_2$ to $H_2O_2$ mol ratio. Then, the process is operated continuously for as long as desired, adding NaCl, and aqueous $H_2O_2$ and $NaBO_2$ continuously to the first tank to maintain the desired $NaBO_2/H_2O_2$ ratio. The temperature is maintained at, for example, 40°C, and a portion of the resulting suspension of coarse trihydrate particles is removed continuously to maintain a constant volume in the tank. The removed suspension is fed into a second tank where its temperature is lowered, for example, to 1°C, thereby reducing the solubility and causing the trihydrate to crystallize as quantitatively as possible. The cooled suspension is then processed to yeild a dried sodium perborate trihydrate product.

Example I

A stainless steel, stirred tank of 1.5 m³ useful capacity, provided with a cooling jacket and a heating and cooling coil, was filled with a trihydrate suspension containing 240g/l trihydrate and 180 g/l sodium chloride. The suspension was heated to 40°C. By adding sodium metaborate liquor, the mol ratio $NaBO_2$ to $H_2O_2$ in the clear mother liquor was adjusted to 1:0.53. This filled the tank to 80 percent of useful capacity.

Subsequently, 65 l/h hydrogen peroxide solution containing 194 g/l $H_2O_2$ and 117 l/h sodium metaborate liquor containing 217 g/l $NaBO_2$ were fed into the tank at the same time and continuously. This kept the mol ratio in the clear mother liquor at 1 : 0.53. The small excess of metoborate liquor is required because the mol ratio of the boron component to the hydrogen peroxide in the end product is not exactly 1 : 1; the boron component is present in a slight excess.

Over a period of one hour, 36 kilograms of solid sodium chloride were also added to the tank.

Per hour, 200 liters of the tank suspensions, containing 240 g/l of trihydrate product, were withdrawn from the tank and cooled in a second stirred tank, likewise provided with a cooling coil, to about 1°C.

Subsequently, the trihydrate crystals are separated from the mother liquor in a centrifuge and then dried in a fluidized bed.

Trihydrate product was produced at the rate of 45 kg/h. It had a nascent oxygen content of 11.78 weight-percent. Besides the 45 kg/h of product, 3 kg/h of trihydrate dust were collected in a cyclone attached to the fluidized bed dryer. This dust could be fed back into the first tank; or it could be used to make an aqueous trihydrate seed suspension and then fed into the first tank.

The sieve analysis of the resulting trihydrate product was as follows in weight-percent:

|       |         |    |        |
|-------|---------|----|--------|
|       | > 0.6   | mm | 0.4 %  |
| 0.3   | − 0.6   | mm | 76.6 % |
| 0.15  | − 0.3   | mm | 22.4 % |
| 0.12  | − 0.15  | mm | 0.4 %  |
| 0.075 | − 0.12  | mm | 0.1 %  |
|       | < 0.075 | mm | 0.1 %  |

The average particle size was 0.25 mm and the apparent density was 0.55 kg/l.

Example II

Using the apparatus of Example I and proceeding in the manner of that Example, the mol ratio $NaBO_2$ to $H_2O_2$ in the clear mother liquor was adjusted to 1:0.40. Per hour, 73 l of hydrogen peroxide solution and 137 l of metaborate liquor were fed, together with 41 kg of sodium chloride, into the first tank during continuous cooperation. Suspension was removed from the first tank at the rate of 230 liters per hour. Trihydrate product was produced at the rate of 50 kg per hour. It had a nascent oxygen content of 11.80 weight-percent. The cyclone collected 4 kg dust. The sieve analysis was as follows in weight-percent:

|     |       |    |       |
|-----|-------|----|-------|
|     | > 0.6 | mm | 2.0%  |
| 0.3 | − 0.6 | mm | 20.5% |

| | | | |
|---|---|---|---|
| 0.15 | − 0.3 | mm | 59.5% |
| 0.12 | − 0.15 | mm | 12.1% |
| 0.075 | − 0.12 | mm | 5.0% |
| | < 0.075 | mm | 0.9% |

The average particle size was 0.20 mm, with the apparent density lying at 0.53 kg/l.

It will be understood that the above description of the present invention susceptible to various modifications, changes and adaptations, and the same are intended to be comprehended within the meaning and range of equivalents of the appended claims.

We claim:

1. A method for producing sodium perborate trihydrate of the formula $NaBO_3·3H_2O$, comprising mixing, at a temperature above 10°C, hydrogen peroxide with a sodium metaborate solution in the presence of seed crystals of sodium perborate trihydrate and an alkali salt of a strong acid for reducing the solubility of sodium perborate and maintaining a $NaBO_2$ to $H_2O_2$ mol ratio in the resulting mixture in the range 1:0.4 to 1:0.7, while keeping the temperature thereof at 20° to 60°C.

2. A method as claimed in claim 1, further comprising removing a portion of the resulting mixutre for collecting sodium perborate trihydrate product, the mixing, maintaining, and removing being performed continuously.

3. A method as claimed in claim 1, further comprising keeping the resulting mixture at 30° to 50°C.

4. A method as claimed in claim 1, wherein the $NaBO_2$ to $H_2O_2$ ratio is maintained in the range 1:0.5 to 1:0.6.

5. A method as claimed in claim 4 wherein the alkali salt is sodium chloride.

* * * * *